United States Patent
Lu et al.

(10) Patent No.: US 9,595,875 B2
(45) Date of Patent: Mar. 14, 2017

(54) VOLTAGE CONVERTER COMPENSATION APPARATUS AND METHODS

(71) Applicant: TEXAS INSTRUMENTS INCORPORATED, Dallas, TX (US)

(72) Inventors: Bing Lu, Bedford, NH (US); Ulrich B. Goerke, Dover, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/335,849

(22) Filed: Jul. 18, 2014

(65) Prior Publication Data
US 2015/0029762 A1    Jan. 29, 2015

Related U.S. Application Data

(60) Provisional application No. 61/859,589, filed on Jul. 29, 2013.

(51) Int. Cl.
*H02M 3/335*    (2006.01)
*H02M 1/00*    (2006.01)

(52) U.S. Cl.
CPC ....... *H02M 3/33523* (2013.01); *H02M 3/335* (2013.01); *H02M 3/33507* (2013.01); *H02M 3/33546* (2013.01); *H02M 3/33592* (2013.01); *H02M 2001/0025* (2013.01)

(58) Field of Classification Search
CPC .................................................. H02M 3/335
USPC ........................................... 363/21.17, 21.18
See application file for complete search history.

(56) References Cited

U.S. PATENT DOCUMENTS

| | | |
|---|---|---|
| 2012/0002451 A1 | 1/2012 | Djenguerian et al. |
| 2012/0069609 A1* | 3/2012 | Christophe et al. ........ 363/21.12 |
| 2012/0153866 A1* | 6/2012 | Liu ................................. 315/294 |
| 2013/0064566 A1* | 3/2013 | Kojima ............. H02M 3/33523 399/88 |
| 2013/0155724 A1 | 6/2013 | Baurle et al. |
| 2013/0169182 A1* | 7/2013 | Park et al. ..................... 315/219 |

FOREIGN PATENT DOCUMENTS

RU        2260833 C1    9/2005

OTHER PUBLICATIONS

PCT/US14/48661 Search Report, mailed Dec. 25, 2014 (2 pages).
English Machine Translation for RU2260833C1.

* cited by examiner

*Primary Examiner* — Jue Zhang
*Assistant Examiner* — Trinh Dang
(74) *Attorney, Agent, or Firm* — William B. Kempler; Chares A. Brill; Frank D. Cimino (57) ABSTRACT

On the secondary side of a flyback switching power converter, a compensation diode and a voltage divider with an averaging circuit generate an output current-compensated reference voltage that is proportional to converter output current. The current-compensated reference voltage is added to a regulation feedback controller reference voltage, which in turn adjusts the negative feedback signal to the PWM regulation controller on the primary side in proportion to the converter output current draw. The net effect is to increase the converter output voltage set-point in proportion to the converter output current draw as compensation for a voltage drop in a cable connecting the converter to a powered device. More precisely-regulated voltage levels may be delivered to an input of the powered device as a result.

19 Claims, 4 Drawing Sheets

VOLTAGE CONVERTER COMPENSATION APPARATUS AND METHODS

PRIORITY CLAIM

This application claims the benefit of priority under 35 U.S.C. §119(e) to U.S. Provisional Patent Application Ser. No. 61/859,589 titled "Cable Compensation Method for Secondary Side Feedback," filed on Jul. 29, 2013 and incorporated herein by reference in its entirety.

TECHNICAL FIELD

Structures and methods described herein relate to electronic voltage conversion and regulation, including compensation for voltage drops in one or more conductors connecting a voltage converter to a load.

BACKGROUND INFORMATION

Electrical power sources and the devices powered by them are generally connected by cables which provide for current flow between the power source and the device to be powered. Modern electronic circuits are usually direct-current ("DC") powered, and the DC power supply often includes voltage regulation circuitry to provide for stable supply voltage level(s). For reasons of convenience and for ease of regulatory approval, small alternating current ("AC")-to-DC power supplies ("converters") that reside at the wall power outlet ("wall converters") have become increasingly popular over the past few decades. It is noted that the terms "converter," "voltage converter," "power converter," and "adapter," shall be synonymous as used herein. It is also noted that the principles illustrated using examples herein may apply equally to AC/DC converters and DC/DC converters.

Figure 1:
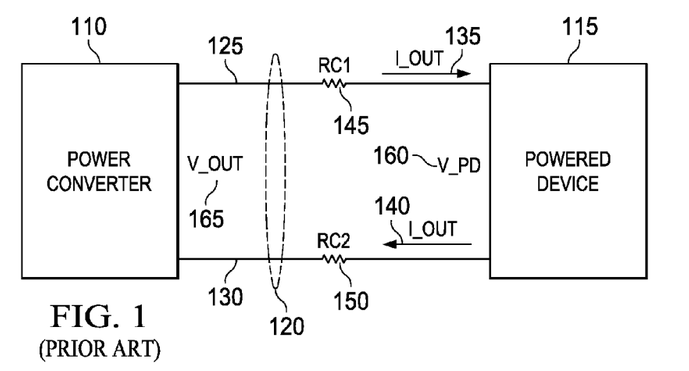
FIG. 1 is a prior-art block diagram illustrating a power converter and a device powered by the converter.

FIG. 1 is a prior-art block diagram illustrating a power converter 110 and a device 115 powered by the converter 110. The power converter 110 may, but need not be, a wall adapter. The power converter 110 and the powered device 115 are connected by a cable 120. The cable 120 includes two or more conductors (e.g., the conductors 125 and 130). Two or more conductors 125 may be necessary in the case of a multi-voltage power converter. The conductor(s) 125 carry current 135 to the powered device 115 and the conductor 130 carries return current 140.

There is a resistance 145 associated with the conductor 125 and a resistance 150 associated with the conductor 130. The values of both resistances 145 and 150 are a function of the gauge, length, and composition of the conductors 125 and 130, respectively. Currents 135 and 140 flowing through the resistances 145 and 150, respectively, cause a voltage drop across the cable 120 proportional to the currents 135 and 140. The cable voltage drop results in the input voltage V_PD 160 to the powered device 115 being unequal to the regulated output voltage V_OUT 165 of the converter 110. The cable voltage drop may be compensated for if the cable resistance characteristics and powered device operating currents are known by the designers of the converter 110.

An increasingly popular type of AC/DC converter supplies a regulated universal serial bus ("USB") level voltage of 5.0 vdc for charging of mobile phones and other portable electronic devices. Such examples of the powered device 115 employ increasingly faster and more powerful processors, larger-capacity memory devices, etc., resulting in high current draws. The latter high current draws can result in a cable voltage drop that is significant in relation to a USB-level V_OUT 165 of 5.0 vdc. This situation can result in a challenge for cable voltage drop compensation at the regulation circuitry of the converter 110.

SUMMARY OF THE INVENTION

Apparatus disclosed herein are applicable to voltage regulation circuits in "flyback" type pulse width modulation ("PWM") AC/DC and DC/DC switching voltage converters. Flyback converters include a flyback transformer to receive variable duty cycle current pulses through the primary winding of the transformer. As used herein, the term "flyback converter" shall mean a voltage converter which adjusts the width and/or duty cycle of pulses conducted through the primary side winding of a transformer in order to control the voltage waveform generated at the secondary winding such that the duty cycle of the voltage waveform at the secondary-side winding is proportional to the converter output current.

A flyback voltage converter may employ primary-side regulation or secondary-side regulation. As used herein, "primary side" shall mean circuitry directly or indirectly connected to the transformer primary winding or to an auxiliary winding referenced to the primary winding. "Secondary side" shall mean circuitry directly or indirectly connected to the transformer secondary winding. In primary-side regulation, secondary voltage is typically sensed with an auxiliary transformer winding and compared to a primary-side reference voltage. A resulting difference signal is fed back to a PWM regulation controller to adjust the primary winding drive pulse width and/or duty cycle for voltage regulation purposes. In secondary-side regulation, the rectified and filtered converter output voltage is sensed and compared to a secondary-side reference voltage. A resulting difference signal is fed back to the PWM regulation controller to adjust the primary winding drive pulse.

Apparatus disclosed herein are applicable to secondary-side regulated flyback voltage converters. Generally speaking, secondary-side regulation is more precise because the actual DC output voltage is used to create the voltage control feedback signal. However, measures of regulator output current are necessary to determine actual interconnection cable voltage drop and the corresponding regulated output voltage compensation, as previously discussed. Output current may be measured by measuring the voltage drop across a resistor in series with the regulator output. However, such a series resistor adds cost as an external component, consumes power, and generates heat and is thus undesirable.

Converter output voltage is sensed across a voltage divider connected between the converter output and ground or other sensing circuit. A regulation device such as a TL431 or circuit ("regulation feedback controller") compares the sensed output voltage to a reference voltage. The regulation feedback controller generates a negative feedback control signal representing the difference between the sensed regulator output voltage and the reference voltage. The negative feedback control signal is routed back to the PWM regulation controller to adjust the primary current pulse width and/or duty cycle. The current pulse is adjusted in a direction such as to cause the magnitude of the sensed output voltage to be driven toward the magnitude of the reference voltage. In some embodiments, the regulation feedback controller may drive an optocoupler in order to electrically isolate the primary and secondary side circuitry.

Embodiments herein include a compensation diode and a voltage divider with an averaging circuit to generate a current compensation reference voltage that is proportional to regulator output current averaged over a PWM cycle. The current compensation reference voltage is added to the regulation feedback controller reference voltage, which in turn adjusts the negative feedback signal to the PWM regulation controller in proportion to the converter output current draw. The net effect is to increase the converter output voltage in proportion to the converter output current draw as compensation for the voltage drop in the cable connecting the converter to the powered device.

DETAILED DESCRIPTION

Figure 2:
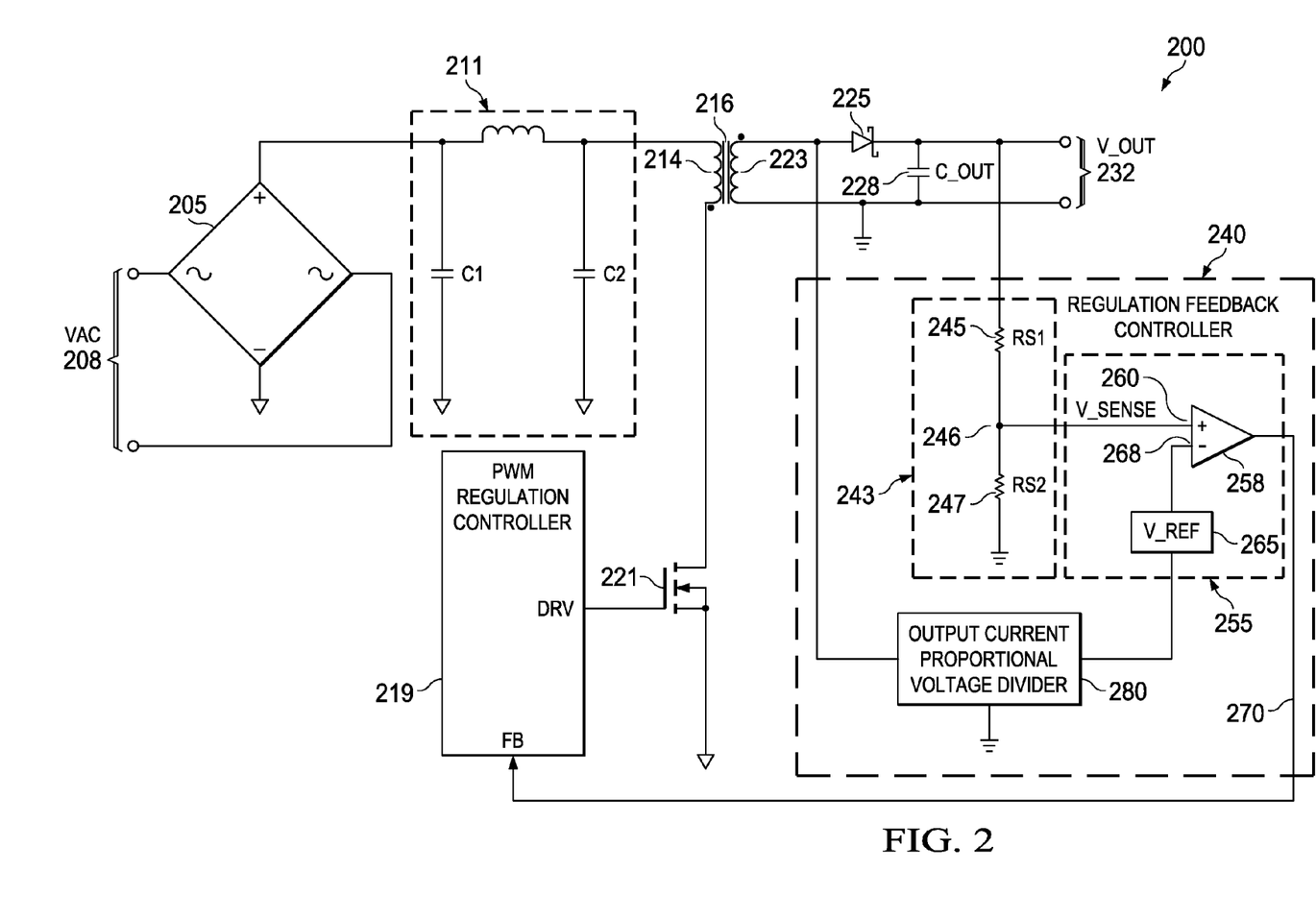
FIG. 2 is a schematic diagram of an example voltage converter including a voltage drop compensation apparatus according to various example embodiments of the invention.

FIG. 2 is a schematic diagram of an example voltage converter 200 including a voltage drop compensation apparatus 240 according to various example embodiments of the invention. The voltage converter 200 is an example of an AC/DC converter. However, embodiments and methods herein apply equally to AC/DC and DC/DC converters, as previously mentioned. The example voltage converter 200 includes a bridge rectifier 205 and a voltage ripple filtering circuit 211 to supply DC voltage to a primary winding 214 of a flyback transformer 216. A PWM regulation controller 219 determines an appropriate conduction duty cycle of a primary winding current control switch 221. Primary winding voltage pulses of variable width induce voltage in a secondary winding 223 of the flyback transformer 216. The secondary winding voltage is rectified by a diode 225 and the resulting DC voltage is filtered by a capacitor 228, resulting in an output voltage V_OUT at an output 232 of the converter 200.

The voltage drop compensation apparatus 240 includes an output voltage sense circuit 243 coupled to the output 232 of the voltage converter 200. The output voltage sense circuit 243 generates an output voltage sense signal that is proportional to the output voltage V_OUT generated by the voltage converter 200. In some embodiments, the output voltage sense circuit 243 may include a first voltage sense resistor 245. The first voltage sense resistor 245 may be coupled between the output 232 of the voltage converter 200 and a voltage sense input terminal 260 of a regulation feedback controller 255 such as a differential amplifier 258 and a reference voltage source 265. The output voltage sense circuit 243 may also include a second voltage sense resistor 247 coupled at a node 246 between the voltage sense input 260 of the differential amplifier 258 and a common voltage rail. The common voltage rail is generally a ground rail but may be a voltage rail other than ground in some embodiments.

The voltage drop compensation apparatus 240 also includes the regulation feedback controller 255 previously mentioned. The feedback controller 255 is coupled to the output voltage sense circuit 243 (e.g., at the node 246). The feedback controller 255 determines a voltage difference between the output voltage sense signal and a reference voltage. The feedback controller 255 generates a negative feedback control signal to send to the PWM regulation controller 219. The negative feedback control signal causes the PWM regulation controller 219 to drive the converter output voltage V_OUT closer to a set-point determined by the reference voltage.

In some embodiments, the regulation feedback controller 255 may include a differential amplifier 258, as previously mentioned. In such case, a voltage sense input terminal 260 of the differential amplifier 258 is coupled to the output voltage sense circuit 243. An output terminal of the differential amplifier 258 is coupled to the PWM regulation controller 219. The regulation feedback controller 255 also includes a reference voltage source 265. The reference voltage source 265 is coupled between an output current proportional voltage divider 280 (further described below) and a reference voltage input terminal 268 of the differential amplifier 258. The reference voltage source 265 supplies the afore-mentioned reference voltage.

The voltage drop compensation apparatus 240 may also include an optocoupler (not shown in FIG. 2). The optocoupler is connected in series with a conductor 270 of the negative feedback control signal to galvanically isolate a primary side of the voltage converter 200 from a secondary side of the voltage converter 200.

The voltage drop compensation apparatus 240 also includes an output current proportional voltage divider 280, as previously mentioned. The output current proportional voltage divider 280 is coupled to the secondary winding 223 of the flyback transformer 216. In some embodiments, the output current proportional voltage divider 280 may also be coupled to a common voltage rail including a ground rail. The voltage divider 280 increases the reference voltage at the input terminal 268 in proportion to a magnitude of current flow at the output 232 of the converter 200. Doing so increases the output voltage set-point of the converter 200 to compensate for a voltage drop between the converter 200 and a device powered by the converter 200 (e.g., the powered device 115 of FIG. 1). The voltage drop may occur across a cable connecting the converter 200 and the powered device 115 as previously described.

Figure 3:
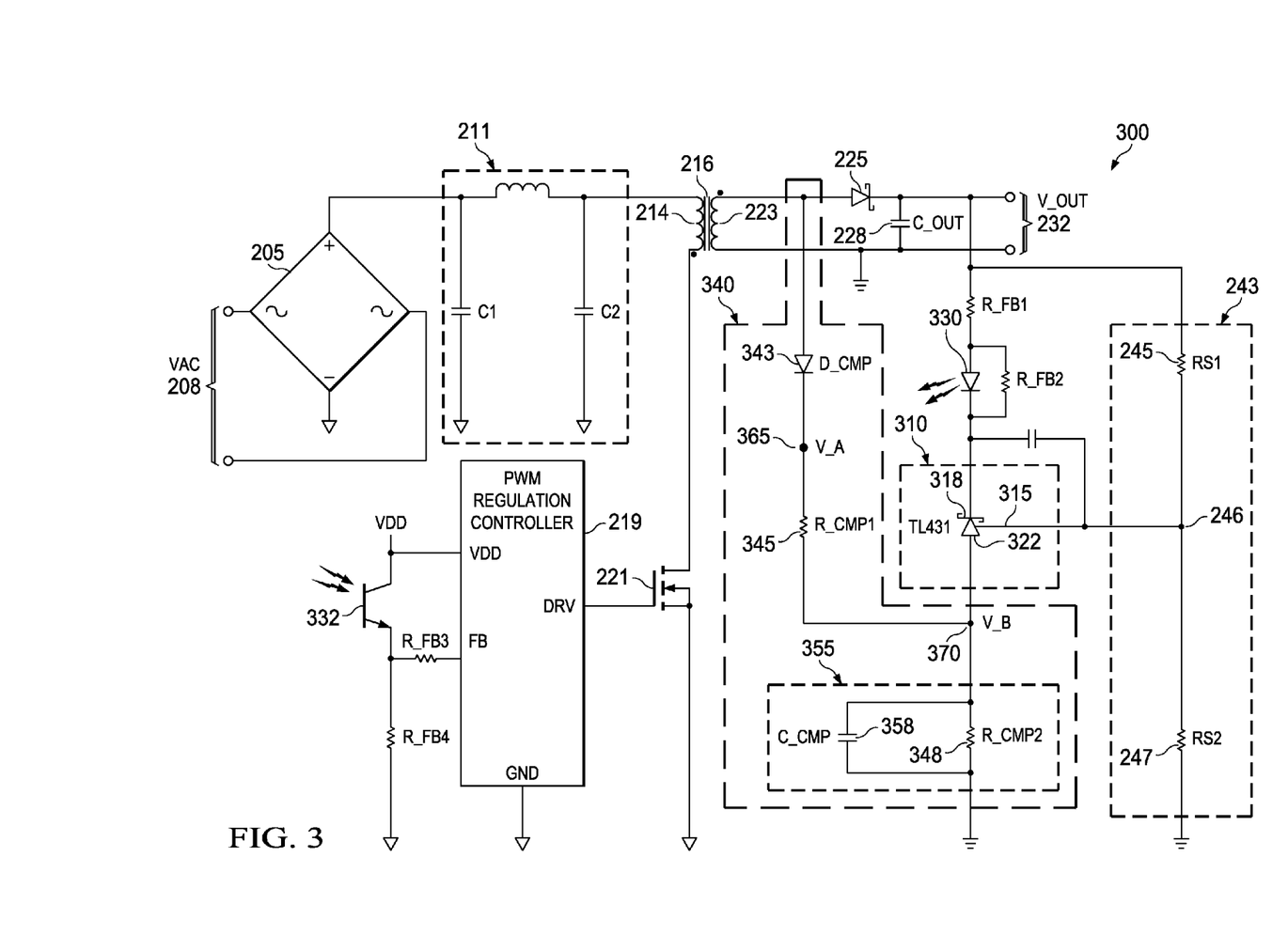
FIG. 3 is a schematic diagram of an example voltage converter including a voltage drop compensation apparatus according to various example embodiments of the invention.

FIG. 3 is a schematic diagram of an example flyback voltage converter 300 including a voltage drop compensation apparatus 340 according to various example embodiments of the invention. The example voltage converter 300 includes a bridge rectifier 205, a voltage ripple filtering circuit 211, a primary winding 214 of a flyback transformer 216, a PWM regulation controller 219, a primary winding current control switch 221, a secondary winding 223, a diode 225, a filtering capacitor 228, and an output 232, all as previously described with respect to the voltage converter 200 of FIG. 2.

The voltage converter 300 also includes a voltage drop compensation apparatus. The voltage drop compensation apparatus includes an output voltage sense circuit 243 to generate an output voltage sense signal proportional to the output voltage V_OUT as previously described with respect to the voltage converter 200 of FIG. 2. Some embodiments of the voltage sense circuit 243 include first and second voltage sense resistors 245 and 247, respectively. The first and second voltage sense resistors 245 and 247 are coupled in series between the output 232 of the voltage converter 300 and a common voltage rail such as a ground rail. A junction node 246 of the first and second voltage sense resistors 245 and 247 is coupled to a reference input terminal 315 of a regulation device 310. In some embodiments, the regulation device 310 may be a shunt regulator such as a TL431 as further described below.

The regulation device 310 determines a voltage difference between the output voltage sense signal and an internal reference voltage. The regulation device 310 generates a negative feedback control signal that is proportional to the voltage difference. The negative feedback control signal causes the PWM regulation controller 219 to drive the converter output voltage V_OUT closer to a set-point determined by the reference voltage. In some embodiments, the voltage drop compensation apparatus also includes an optocoupler. A light-emitting element 330 of the optocoupler is communicatively coupled in series between the regulation device 310 and the output 232 of the voltage converter 300. The optocoupler couples a galvanically isolated version of the negative feedback control signal as light energy to an optical receiver portion 332 of the optocoupler configured at the PWM regulation controller 219.

The voltage drop compensation apparatus also includes an output current proportional voltage divider and averaging circuit 340. The output current proportional voltage divider and averaging circuit 340 is coupled to the secondary winding 223 of the flyback transformer 216. The output current proportional voltage divider and averaging circuit 340 increases the reference voltage in proportion to current flow at the output 232 of the voltage converter 300. Doing so increases the converter output voltage set-point to compensate for a voltage drop between the converter 300 and a device powered by the converter 300 (e.g., the powered device 115 of FIG. 1). The voltage drop may occur across a cable connecting the converter 300 and the powered device 115 as previously described.

Figure 4:
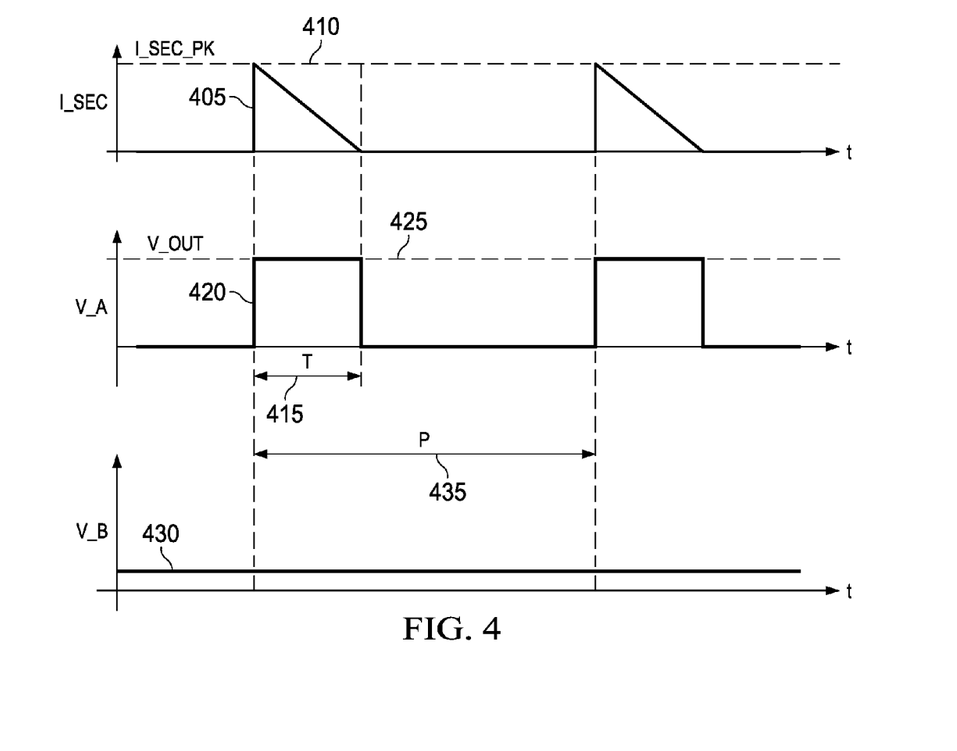
FIG. 4 is a waveform diagram illustrating waveforms associated with an output current proportional voltage divider and averaging circuit portion of a voltage drop compensation apparatus according to various example embodiments.

FIG. 4 is a waveform diagram illustrating waveforms associated with the output current proportional voltage divider and averaging circuit 340 according to various example embodiments. FIG. 4 will be referenced along with FIG. 3 in the discussion below to offer a more complete understanding of the operation of the output current proportional voltage divider and averaging circuit 340.

A voltage divider portion of the output current proportional voltage divider and averaging circuit 340 includes a compensation diode 343. The compensation diode 343 is anode-coupled to the secondary winding 223 of the flyback transformer 216. The compensation diode 343 directs current flow in a forward direction from the secondary winding 223.

The top waveform of FIG. 4 illustrates current pulses 405 traversing the secondary winding 223. The PWM regulation controller 219 determines the peak current 410 and adjusts the duty cycle of the primary (and thus secondary) winding current pulses 405. The duty cycle is defined as the pulse length 415 divided by the PWM cycle period 435. The middle waveform of FIG. 4 illustrates voltage pulses 420 at a nodal junction 365 of the cathode of the compensation diode 343 and a terminal of a first compensation resistor 345. The pulse length 415 of the cathode voltage pulses 420 corresponds to the pulse length 415 of the secondary current pulses 405. The peak voltage 425 of the cathode voltage pulses 420 is equal to the output voltage V_OUT of the converter 300 plus the voltage drop across the rectifying diode 225 minus the voltage drop across the compensation diode 343. The peak voltage 425 is approximately equal to V_OUT because the voltage drops across the two diodes 225 and 343 are approximately equal but of opposite polarity and therefor effectively cancel each other in determining the peak voltage 425.

The voltage divider portion of the output current proportional voltage divider and averaging circuit 340 also includes the first compensation resistor 345. A first terminal of the first compensation resistor 345 is coupled to a cathode of the compensation diode 343 as previously mentioned. The voltage divider portion of the output current proportional voltage divider and averaging circuit 340 further includes a second compensation resistor 348. The second compensation resistor 348 is coupled in series between the first compensation resistor 345 and a common voltage node (e.g., a ground terminal).

A voltage division node 370 is located at a junction of the first and second compensation resistors 345 and 348, respectively. The voltage division node 370 is coupled to a terminal of a reference voltage source (not shown in FIG. 3) associated with the regulation device 310. In the example case of a shunt regulation device such as a TL431, the reference voltage source is located internally to the regulation device 310. The voltage generated at the voltage division node 370 is additive to the reference voltage generated by the reference voltage source. The voltage divider portion of the circuit 340 thus increases the total reference voltage of the regulation device 310 by a magnitude of the voltage generated at the voltage division node 370.

An averaging circuit portion 355 of the output current proportional voltage divider and averaging circuit 340 includes a compensation capacitor 358. The compensation capacitor 358 is coupled in parallel with the second compensation resistor 348 to create a resistor-capacitor ("RC") low-pass filter. The averaging circuit 355 averages a voltage-divided version of the rectangular voltage waveform pulses 420 of FIG. 4 appearing at the node 365. The voltage-divided version of each voltage pulse 420 is averaged over the PWM cycle period 435 to generate a continuous DC offset voltage 430 at the voltage division node.

Figure 5:
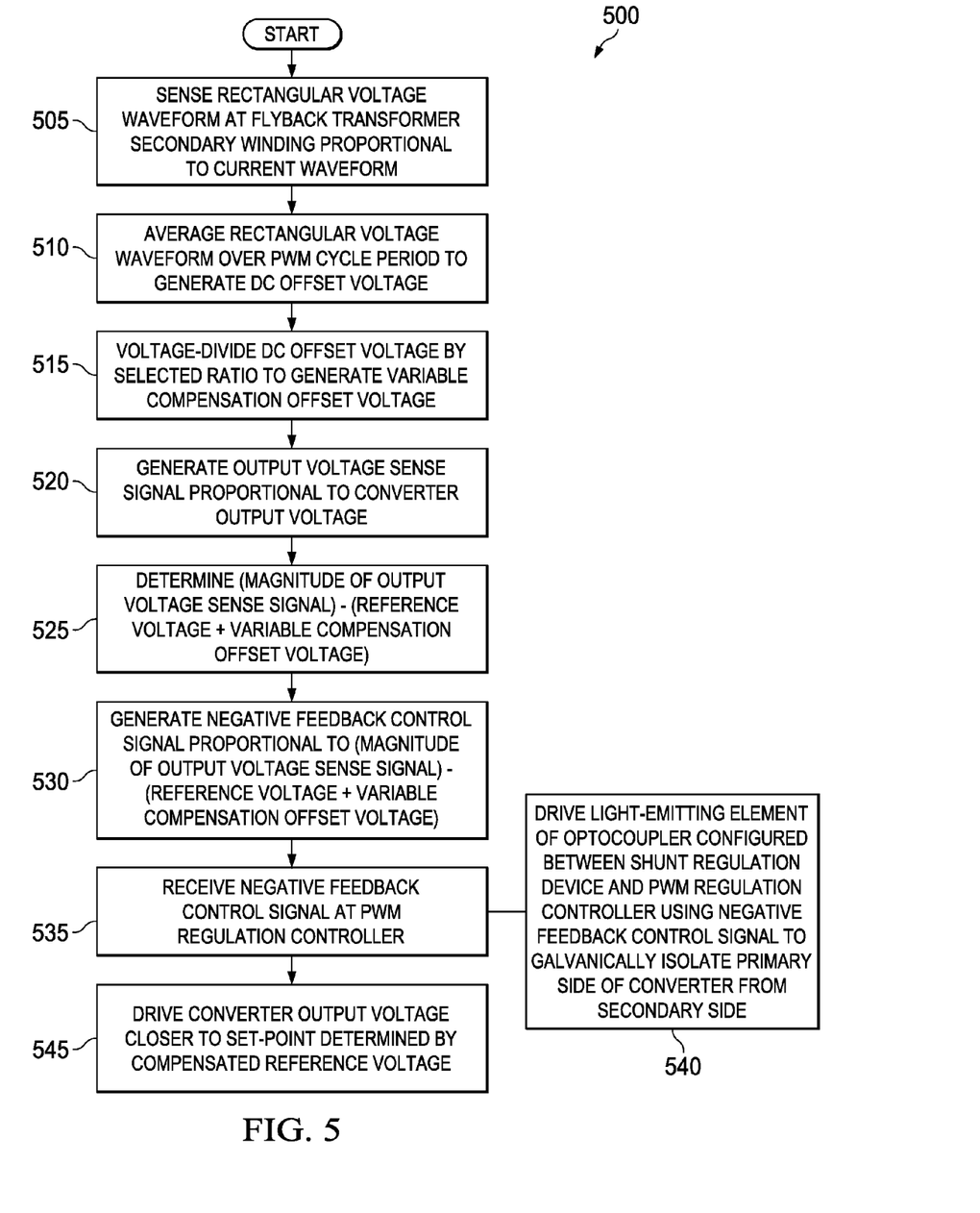
FIG. 5 is a flow diagram illustrating a method of voltage regulation in a flyback voltage converter including voltage drop compensation according to various example activities.

FIG. 5 is a flow diagram illustrating a method 500 of voltage regulation in a flyback voltage converter including voltage drop compensation according to various example activities. The method 500 is associated with a regulation device communicatively coupled to a converter output voltage sense circuit and to a pulse-width modulation ("PWM") regulation controller portion of the voltage converter. The afore-said apparatus implement a negative feedback converter output voltage control loop. The method 500 includes increasing a reference voltage by a magnitude of a variable compensation offset voltage proportional to a magnitude of current flow at a converter output to generate a compensated reference voltage. Compensating the reference voltage as described increases the converter output voltage set-point. Doing so compensates for a voltage drop in a cable used to couple the converter to a device powered by the converter.

The method 500 commences at block 505 with sensing a rectangular voltage waveform at a secondary winding of a flyback transformer associated with the flyback voltage converter. The rectangular voltage waveform has a duty cycle equal to a duty cycle of a waveform of a pulsed current flowing through the secondary winding as determined by the PWM regulation controller. The rectangular voltage waveform also has a peak voltage magnitude that is proportional to the converter output voltage.

The method 500 includes averaging the rectangular voltage waveform over a PWM cycle period to generate a DC offset voltage, at block 510. The method 500 also includes voltage-dividing the DC offset voltage by a selected ratio to generate the variable compensation offset voltage, at block 515.

The method 500 continues at block 520 with generating an output voltage sense signal proportional to an output voltage generated by the voltage converter. The method 500 includes determining a voltage difference between a magnitude of the output voltage sense signal and the compensated reference voltage at the regulation device, at block 525. The method 500 also includes generating a negative feedback control signal proportional to the voltage difference, at block 530.

The method 500 continues at block 535 with receiving the negative feedback control signal at the PWM regulation controller. Some versions of the method 500 include driving a light-emitting element associated with an optocoupler configured between the regulation device and the PWM regulation controller using the negative feedback control signal, at block 540. Doing so galvanically isolates a primary side of the flyback voltage converter from a secondary side of the converter.

The method 500 includes driving the converter output voltage closer to a set-point determined by the compensated reference voltage to decrease a magnitude of the voltage difference, at block 545. The method 500 continues indefinitely by looping from block 545 to block 505.

Apparatus and methods described herein may be useful in applications other than compensating voltage converter output voltage levels for voltage drops across cables connecting a voltage converter to a device to be powered. The apparatus 200 and 300 and the method 500 are intended to provide a general understanding of the sequences of various methods and the structures of various embodiments. They are not intended to serve as complete descriptions of all elements and features of methods, apparatus and systems that might make use of these example sequences and structures.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems such as robotics, medical devices (e.g., heart monitor, blood pressure monitor, etc.), motor vehicles, televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), set top boxes, household appliances and others.

Structures and methods disclosed herein include a compensation diode and a voltage divider with an averaging circuit to generate an output current-compensated reference voltage that is proportional to regulator output current. The current compensation reference voltage is added to the regulation feedback controller reference voltage, which in turn adjusts the negative feedback signal to the PWM regulation controller in proportion to the converter output current draw. The net effect is to increase the converter output voltage in proportion to the converter output current draw as compensation for the voltage drop in the cable connecting the converter to the powered device. More precisely-regulated voltage levels may be delivered to an input of the powered device.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A voltage drop compensation apparatus associated with voltage regulation in a flyback voltage converter, comprising:

an output voltage sense circuit to couple to an output of the flyback voltage converter to generate an output voltage sense signal proportional to an output voltage generated by the flyback voltage converter;

a regulation feedback controller coupled to the output voltage sense circuit to determine a voltage difference between the output voltage sense signal and a reference voltage and to generate a negative feedback control signal to send to a pulse width modulation ("PWM") regulation controller, the negative feedback control signal to cause the PWM regulation controller to drive the flyback converter output voltage closer to a set-point determined by the reference voltage; and an output current proportional voltage divider to couple to a secondary winding of a flyback transformer associated with the flyback voltage converter for receiving an unrectified for converting the unrectified pulse waveform into a DC offset voltage to increase the reference voltage in proportion to a magnitude of current flow at the output of the flyback voltage converter and to increase a converter output voltage set-point to compensate for a voltage drop between the flyback voltage converter and a device powered by the flyback voltage converter without direct measurement of the output current.

2. The voltage drop compensation apparatus of claim 1, wherein the voltage drop between the flyback voltage converter and the device powered by the flyback voltage converter being a connecting cable voltage drop.

3. The voltage drop compensation apparatus of claim 1, the regulation feedback controller further comprising:
a differential amplifier with a voltage sense input terminal coupled to the output voltage sense circuit and an output terminal to couple to the PWM regulation controller; and
a reference voltage source coupled between the output current proportional voltage divider and a reference voltage input terminal of the differential amplifier to supply the reference voltage.

4. The voltage drop compensation apparatus of claim 1, the output current proportional voltage divider to couple to a common voltage rail.

5. The voltage drop compensation apparatus of claim 1, further comprising:
an optocoupler coupled in series with a conductor of the negative feedback control signal to galvanically isolate a primary side of the voltage converter from a secondary side of the flyback voltage converter.

6. The voltage drop compensation apparatus of claim 3, the output voltage sense circuit further comprising:
a first voltage sense resistor coupled between the output of the flyback voltage converter and the voltage sense input terminal of the differential amplifier; and
a second voltage sense resistor coupled between the voltage sense input of the differential amplifier and a common voltage rail.

7. The voltage drop compensation apparatus of claim 6, the common voltage rail being a ground rail.

8. A voltage drop compensation apparatus associated with voltage regulation in a flyback voltage converter, comprising:
an output voltage sense circuit to couple to an output of the flyback voltage converter to generate an output voltage sense signal proportional to an output voltage generated by the flyback voltage converter;
a regulation device coupled to the output voltage sense circuit to determine a voltage difference between the output voltage sense signal and a reference voltage and to generate a negative feedback control signal proportional to the voltage difference, the negative feedback control signal to cause a pulse width modulation ("PWM") regulation controller to drive the flyback voltage converter output voltage closer to a set-point determined by the reference voltage;
an output current proportional voltage divider and averaging circuit to couple to a secondary winding of a flyback transformer associated with the flyback voltage converter to increase the reference voltage in proportion to current flow at the output of the voltage converter in order to increase a converter output voltage set-point to compensate for a voltage drop in a cable to couple the converter output to a device powered by the flyback voltage converter without direct measurement of the output current; and
a voltage divider portion of the output current proportional voltage divider and averaging circuit further comprising:

a compensation diode anode-coupled to the secondary winding of the flyback transformer to direct current flow in a forward direction from the secondary winding;
a first compensation resistor with a first terminal coupled to a cathode of the compensation diode; and
a second compensation resistor coupled in series between the first compensation resistor and a common voltage node, a voltage division node at the junction of the first and second compensation resistors coupled to a terminal of a reference voltage source associated with the regulation device in order to increase the reference voltage by a magnitude of a continuous direct current ("DC") voltage generated at the voltage division node.

9. The voltage drop compensation apparatus of claim 8, the regulation device being a TL431 shunt regulator.

10. The voltage drop compensation apparatus of claim 8, an averaging circuit portion of the output current proportional voltage divider and the averaging circuit further comprising:
a compensation capacitor coupled in parallel with the second compensation resistor to create a resistor-capacitor ("RC") low-pass filter, the low-pass filter to average a voltage-divided version of a series of rectangular voltage pulses appearing at a node between the cathode of the compensation diode and the first terminal of the first compensation resistor, a duration T of each rectangular voltage pulse equal to a duration T of each of a series of current pulses flowing in the secondary winding as determined by the PWM regulation controller, the averaging circuit to average the voltage-divided version of each rectangular voltage pulse over a PWM cycle period P to generate the continuous DC voltage at the voltage division node.

11. The voltage drop compensation apparatus of claim 8, further comprising:
an optocoupler, a light-emitting element of the optocoupler communicatively coupled in series between the regulation device and the output of the flyback voltage converter to couple a galvanically isolated version of the negative feedback control signal as light energy to an optical receiver portion of the optocoupler configured at the PWM regulation controller.

12. The voltage drop compensation apparatus of claim 8, the output voltage sense circuit further comprising:
a first voltage sense resistor coupled between the output of the flyback voltage converter and a reference input terminal of the regulation device; and
a second voltage sense resistor coupled between the reference input terminal of the regulation device and a common voltage rail.

13. A method of voltage regulation in a flyback voltage converter, comprising:
at a regulation device communicatively coupled to a flyback voltage converter output voltage sense circuit and to a pulse-width modulation ("PWM") regulation controller portion of the flyback voltage converter to implement a negative feedback converter output voltage control loop, increasing a reference voltage by a magnitude of a variable compensation offset voltage proportional to a magnitude of current flow generated from an unrectified pulse waveform at a converter output to generate a compensated reference voltage in order to increase a converter output voltage set-point to compensate for a voltage drop in a cable used to couple the flyback voltage converter to a device powered by the converter without direct measurement of the output current.

14. The method of voltage regulation in the flyback voltage converter of claim 13, further comprising:
   sensing a rectangular voltage waveform at a secondary winding of a flyback transformer associated with the flyback voltage converter, the rectangular voltage waveform having a duty cycle equal to a duty cycle of a waveform of a current flowing through the secondary winding as determined by the PWM regulation controller and having a peak voltage magnitude substantially equal to output voltage of the secondary winding.

15. The method of voltage regulation in the flyback voltage converter of claim 13, further comprising:
   generating an output voltage sense signal proportional to an output voltage generated by the flyback voltage converter.

16. The method of voltage regulation in the flyback voltage converter of claim 15, further comprising:
   at the regulation device, determining a voltage difference between a magnitude of the output voltage sense signal and the compensated reference voltage; and
   generating a negative feedback control signal proportional to the voltage difference.

17. The method of voltage regulation in the flyback voltage converter of claim 16, further comprising:
   at the PWM regulation controller, receiving the negative feedback control signal; and
   driving the converter output voltage closer to a set-point determined by the compensated reference voltage to decrease a magnitude of the voltage difference.

18. The method of voltage regulation in the flyback voltage converter of claim 17, further comprising:
   driving a light-emitting element of an optocoupler configured between the regulation device and the PWM regulation controller using the negative feedback control signal in order to galvanically isolate a primary side of the flyback voltage converter from a secondary side of the converter.

19. A method of voltage regulation in a flyback voltage converter, comprising:
   at a regulation device communicatively coupled to a flyback voltage converter output voltage sense circuit and to a pulse-width modulation ("PWM") regulation controller portion of the flyback voltage converter to implement a negative feedback converter output voltage control loop, increasing a reference voltage by a magnitude of a variable compensation offset voltage proportional to a magnitude of current flow generated from an unrectified pulse waveform representative of the magnitude of current flow drawn by load at a converter output to generate a compensated reference voltage in order to increase a converter output voltage set-point to compensate for a voltage drop in a cable used to couple the converter to a device powered by the converter further comprising:
   averaging the rectangular voltage waveform over a PWM cycle period to generate a direct current ("DC") offset voltage; and
   voltage-dividing the DC offset voltage by a selected ratio to generate the variable compensation offset voltage further comprising:
   sensing a rectangular voltage waveform at a secondary winding of a flyback transformer associated with the flyback voltage converter, the rectangular voltage waveform having a duty cycle equal to a duty cycle of a waveform of a current flowing through the secondary winding as determined by the PWM regulation controller and having a peak voltage magnitude substantially equal to output voltage of the secondary winding.

* * * * *